Patented Dec. 25, 1934

1,985,347

UNITED STATES PATENT OFFICE 1,985,347

TREATMENT OF NITROCELLULOSE CONTAINING WASTE MATERIAL

Paul Charles Léon Hayemal, Brussels, Belgium

No Drawing. Application July 7, 1932, Serial No. 621,305. In Germany July 20, 1931

2 Claims. (Cl. 260—148)

My invention relates to the treatment of nitrocellulose containing waste material, such as film waste, celluloid scraps and similar material.

The principal object of my invention is the recovery of the nitrocellulose from such materials in a chemically or physically altered form giving solutions of low viscosity and being especially suitable for producing low viscous varnishes on nitrocellulose base.

Another object of my invention is the recovery of the solvents and plasticizers, such as camphor, alcohols, high molecular esters and the like which are usually present in nitrocellulose materials.

It is known in the art, to use nitrocellulose containing waste materials, such as named above, for preparing varnishes on nitrocellulose base, plastic masses and the like. However, the solutions hitherto prepared from this waste suffer from the great defect of being highly viscous and not allowing to incorporate a high content of nitrocellulose. Moreover, the stability of the film waste and the like or of the products hitherto obtained therefrom is mostly insufficient, and the solvents and plasticizers usually contained in such materials in varying quantities make it practically impossible to obtain from these raw materials uniform products with constant properties on account of its different nature and composition.

It is further known in the art to treat nitrocellulose containing waste material in different ways in order to recover the solvents, plasticizers, etc. on one hand and the unaltered nitrocellulose on the other hand, which—being unaltered—shows the inconveniences described when used for preparing nitrocellulose solutions such as varnishes.

According to the present invention the solvents and plasticizers such as camphor are recovered and the nitrocellulose is obtained in an altered—probably partially decomposed or degraded—form, having an excellent stability and yielding solutions of low viscosity and of relatively high concentration.

In operating the process of my invention the raw material, which has been freed of gelatine, albumin, metallic salts and other impurities, is heated with water under pressure, preferably under a pressure from 2 to 4 atmospheres but not exceeding 10 atmospheres, whereby the solvents and plasticizers, such as camphor, tricresyl phosphate, castor oil, fatty acids and the like, separate, and whereby the nitrocellulose is chemically altered, apparently by a partial disintegration of its molecules or aggregates. The period of this heat treatment depends on the degree of viscosity which the solution of the treated nitrocellulose is desired to have. Should the pressure of the autoclave rise too high on account of the reaction becoming too violent, this inconvenience may be counteracted by the means known to the art, as by cooling the autoclave with cold water. Thereupon, the heating of the autoclave is stopped, the autoclave cooled in order to reduce the pressure, the reducing valve opened and the contents of the vessel are boiled for some time at atmospheric pressure or until proper stabilization is reached, when the volatile constituents escape with the steam and may be recovered in the known manner by condensing the vapors. This further boiling of the already altered nitrocellulose at atmospheric pressure, which may be continued from 6 to 48 hours, has a stabilizing effect upon the already altered or degraded and gelatinized nitrocellulose, which is then thoroughly washed with water, freed from the water in known manner, for instance by centrifuging, and carefully dried, preferably in vacuo.

Contrary to other known methods for working up nitrocellulose waste materials according to my process no chemicals are added and no steam is passed through the autoclave during the pressure heating.

The nitrocellulose obtained according to my process has the same or even a greater stability than commercial pyroxylin or "collodion wool".

The following example is given to illustrate my invention.

20 kgs. film waste or celluloid scrap and 250 kgs. of water are heated in an autoclave of 300 to 400 litres, capacity for from 0,5 to 4 hours under a pressure of about 3 atmospheres. The pressure is regulated by blowing off an excess of pressure or preferably by cooling the autoclave with cold water. The heating of the autoclave is then stopped, the pressure reduced to atmospheric pressure and the contents of the autoclave are boiled at atmospheric pressure for from 6 to 48 hours. During this boiling at atmospheric pressure live steam may be introduced into the autoclave. It is obvious that by the boiling of the water further steam is also developed. Up to 95 percent of the volatile solvents or plasticizers present in the raw material thus may be blown off and recovered. The remaining nitrocellulose is then freed from the water in known manner, preferably by centrifuging. The nitrocellulose is washed thoroughly with water, pressed off and dried in a vacuum cupboard. There are thus obtained about 17 kgs. of a nitrocellulose which corresponds in its properties, especially in its solubility and in the viscosity of its solutions, to the product known in the trade as "half-second collodion wool".

By varying the time and the pressure of the pressure heating, a nitrocellulose of any desired degree of viscosity can be obtained.

Having now particularly described and ascertained the nature of my said invention and in what manner the same is to be performed, I declare that what I claim is:—

1. A process for treating nitrocellulose-containing waste materials to recover the solvents and plasticizers of such materials and to obtain nitrocellulose in an altered form, especially suitable for yielding solutions of low viscosity, which comprises heating the said materials, freed from foreign substances, in an autoclave in the presence of water to superatmospheric pressure, regulating the pressure not to exceed 10 atmospheres by cooling and autoclave with water, and then boiling the altered nitrocellulose under atmospheric pressure while passing a current of steam therethrough.

2. A process for treating nitrocellulose-containing waste materials which comprises heating such materials, freed from foreign substances, in an autoclave in the presence of water to superatmospheric pressure, regulating the pressure not to exceed 10 atmospheres by cooling the autoclave, boiling the altered nitrocellulose under atmospheric pressure for from 6 to 48 hours, condensing the vapours recovering the volatile solvents and plasticizers and thoroughly washing the altered and boiled nitrocellulose.

PAUL CHARLES LÉON HAYEMAL.